May 16, 1961 S. A. BATTERSON 2,984,735
RUNWAY LIGHT
Filed Sept. 24, 1959 2 Sheets-Sheet 1

INVENTOR
SIDNEY A. BATTERSON

BY

May 16, 1961  S. A. BATTERSON  2,984,735
RUNWAY LIGHT
Filed Sept. 24, 1959  2 Sheets-Sheet 2

INVENTOR
SIDNEY A. BATTERSON

BY
ATTORNEYS

United States Patent Office 2,984,735
Patented May 16, 1961

2,984,735
RUNWAY LIGHT

Sidney A. Batterson, Newport News, Va., assignor to the United States of America as represented by the Administrator of National Aeronautics and Space Administration Filed Sept. 24, 1959, Ser. No. 842,171
9 Claims. (Cl. 240—1.2)
(Granted under Title 35, U.S. Code (1952), sec. 266)

The invention described herein may be manufactured and used by or for the Government of the United States of America for governmental purposes without the payment of any royalties thereon or therefor.

This invention relates generally to a travelled surface light and more particularly to an aircraft runway light capable of being seen from the air and of being struck by landing gear of airplanes on landing and takeoffs without causing adverse structural effects to the airplane and without causing damage to the light.

A great deal of effort has been devoted to the improvement of runway lighting in order to reduce the minimum visibility requirements which currently impose a severe limitation on flight operations in inclement weather. The results of some recent flight tests have indicated that, when lights are installed along the runway center line in the landing area, most aircraft are capable of landing safely under conditions that approach zero ceiling and zero visibility. Because of the favorable results obtained during these tests, a great interest in installing runway center line lighting on all major runways has developed. The button type runway lights which have been used heretofore protrude from the runway surface and can cause adverse effects on the airplane structure when struck by the aircraft landing gear on takeoff and landing. Furthermore, the illumination which these button type lights produce on the runway surface is somewhat inadequate. Another disadvantage of the button type lights is that runways provided with them cannot have snow removed by snowplows as the plows would damage these lights. A still another disadvantage of the button type lights is that reevaluation of runways from which high speed jet aircraft operate indicates highly adverse structural effects produced on these aircraft by striking protruding objects such as button type lights.

Accordingly, it is an object of the invention to provide a light for location on and illumination of a vehicular travelled surface.

Another object of the invention is to provide a runway light capable of giving substantial illumination to the runway surface under poor visibility weather conditions.

A further object of the invention is to provide a runway light that will not produce adverse structural effects on aircraft striking or running over the light.

Still another object of the invention is to provide a runway light which may be used on runways from which snow is to be removed by snowplows.

Another still further object of the invention is to provide a runway light that will not be damaged if struck by an aircraft during takeoff, landing or taxiing.

A still further object of the invention is to provide a runway light that will not lose its lighting intensity due to the blackening caused by jet aircraft operating on the runway.

One still further object of the invention is to provide a runway light that will provide adequate illumination even after a particular accumulation of snow on the runway surface.

Generally speaking, the foregoing objects as well as others are accomplished in accordance with this invention by providing a light unit capable of emitting light to mark and illuminate the runway surface and of folding flush with the runway surface when struck by an airplane landing wheel without causing any adverse effects or damage to the light unit or the wheel striking the light.

A more complete understanding of the invention and many of the attendant advantages thereof will be readily appreciated as the same becomes better understood by reference to the following detailed description when considered in connection with the accompanying drawings wherein.

Figure 1:
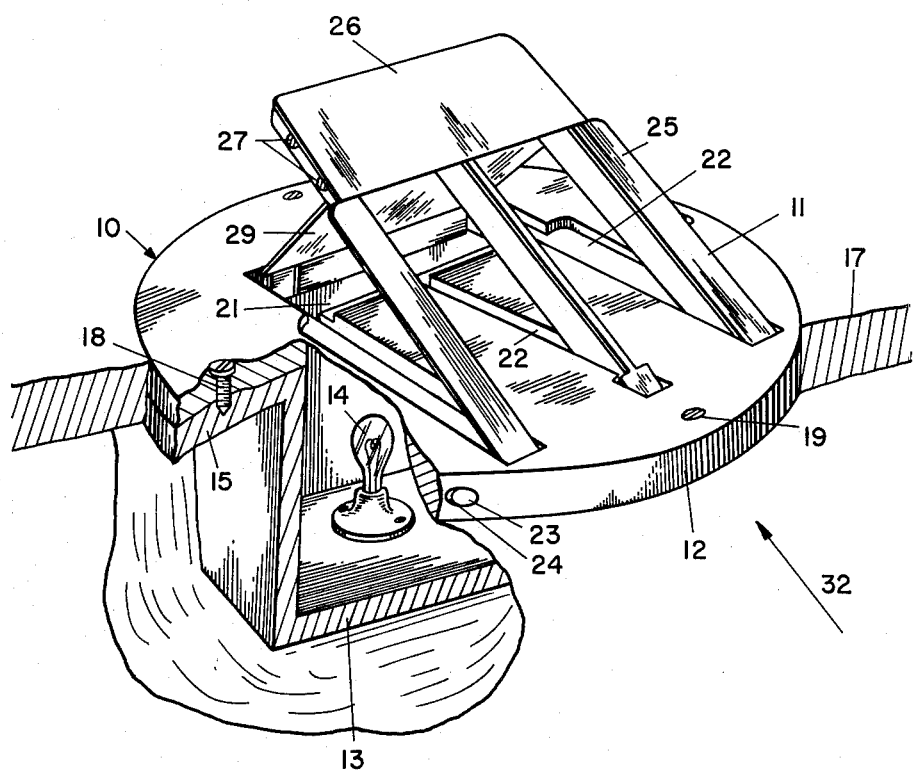
Fig. 1 is a side elevational view, partly broken away, of the runway light unit in an elevated position.

Referring now to the drawings wherein like reference numerals designate identical or corresponding parts throughout the several views, and more particularly to Fig. 1 whereon the runway light unit, generally indicated by the reference numeral 10 is shown as consisting essentially of a reflector carriage 11, top plate 12, and a receptacle 13. The receptacle 13 is generally cup shaped and adapted to be buried into the ground or within the runway. The receptacle houses a lighting unit 14 and is provided with a lip 15 which supports the top plate 12. The lighting unit may be any type which will give adequate illumination to the surface of the runway. The receptacle 13 may be provided with a drain 16, as seen on Fig. 2, which enables rain, snow and any other water finding its way into the receptacle to escape and thereby keep the receptacle 13 free of water.

Figure 2:
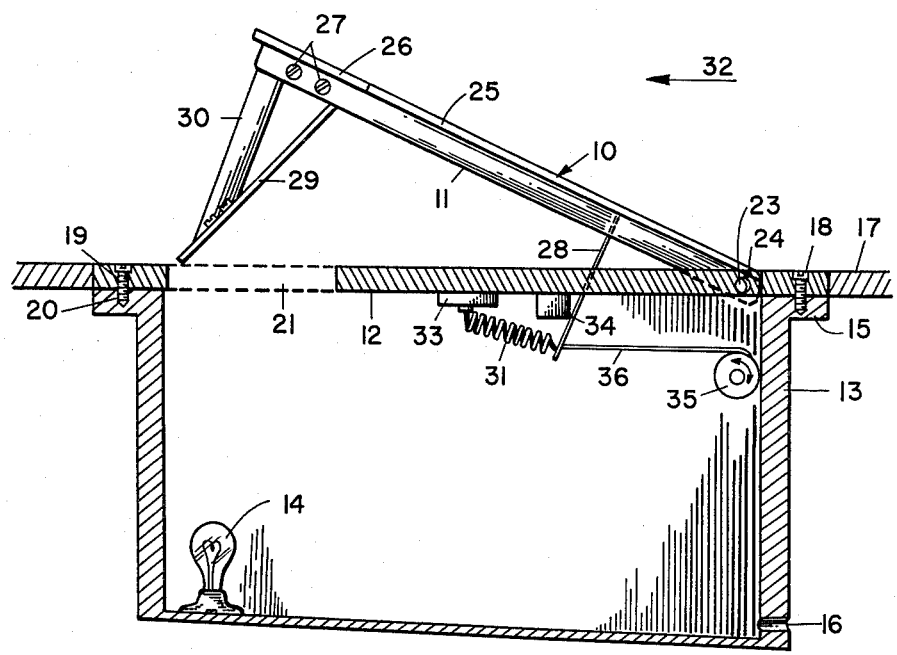
Fig. 2 is a schematic elevational view of the runway light unit in an erected condition.

The top plate 12, as seen on Fig. 2 is preferably a circular disc adapted to be rigidly secured to receptacle 13 by means of bolts 18 positioned within corresponding clearance holes 19 formed along the periphery at predetermined intervals in the top plate 12 and top holes 20 in the lip 15 of the receptacle. The upper surface of top plate 12 is flush with the runway surface.

Figure 3:
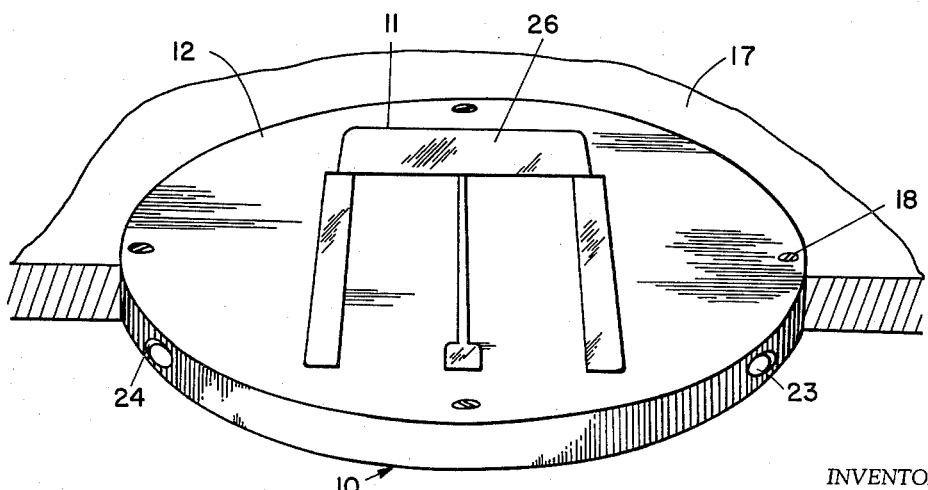
Fig. 3 is a perspective view of the runway light unit in a retracted position.

The top plate 12 has an opening 21 formed therein through which light passes from the lighting means 14. The top plate 12 has grooves, or indentations, 22 formed therein, as seen on Fig. 1, which are adaptable to receive the reflector carriage 11. The reflector carriage is pivotally connected at one end to the top plate 12 by a hinge pin 23. The hinge pin extends through corresponding apertures formed in the carriage 11 and an aperture 24 formed in the top plate 12. The carriage 11 is capable of being elevated, as seen in Figs. 1 and 2, and retracted, as seen in Fig. 3. The reflector carriage 11 in a retracted position is flush with the top plate 12 and runway surface 17.

The reflector carriage 11 consists of three parallel frontal links 25 which are rigidly connected to a cover plate 26 by means of screws 27, as seen in Fig. 1, thereby forming the top flush surface of the reflector carriage in a retracted position, as seen in Fig. 3. As seen in Fig. 1 the grooves 22 formed in the top plate 12 receive the frontal links 25 when the reflector carriage 11 is in a retracted position thereby forming a flush surface with the top plate. As seen in Fig. 2 a frontal link extension 28 is rigidly secured to one of the frontal links and projects downwardly therefrom. A reflector plate 29 is secured to the underside of the coverplate 26 in a manner to project downwardly and outwardly so that a line drawn perpendicularly from the outermost edge of the coverplate 26 will intersect the lowest point on the reflector 29. A brace 30 may be rigidly secured to the reflector 29 and coverplate 26 to give the structure added strength and maintain the reflector in a fixed position.

A spring 31 is attached at one end to the lower end of the frontal link extension 28 and at the other end to the under side of the top plate 12. The spring 31 normally maintains the reflector carriage 11 in a raised position thereby effecting illumination of the runway surface by horizontal reflection of the light from the source 14. The reflector carriage 11 may be retracted, or lowered, by expanding the spring 31. The spring 31 will be expanded by the force of a colliding object, such as, for example, an airplane wheel striking the reflector carriage 11 in the direction indicated by arrowhead 32. The force exerted on the reflector carriage is transferred to the spring causing it to expand and lower the reflector carriage 11. When the force is removed, as for example, by the wheel passing off the reflector carriage, the spring 31 will contract and again raises the reflector carriage 11 above the runway surface. The spring 31 may be attached directly to the underside of the top plate 12, or to a block 33 fastened to the top plate 12, as shown in Fig. 2. The angle of elevation of the reflector carriage 11 may be controlled by placing a stop block 34 on the top plate 12. The stop block 34 restricts the upward swing of the reflector carriage by engaging the frontal link extension 28 and restricting its upward swing.

A motor 35 may also be provided within the receptacle 14 for controlling the operation of the carriage. The motor 35 is preferably an electric motor and the source for energizing the light source may also be used by energizing the electric motor. The electric motor 35 may be any type motor currently on the market which is strong enough to expand spring 31. The motor is provided with control means for elevating and retracting the reflector carriage. A cable 36 is connected at one end to the motor and at the other end to the frontal link extension as shown on Fig. 2. When the motor is energized and the cable wound up, the spring 31 is expanded and the reflector carriage is retracted until it rests flush with the top plate 12. Preferably, the motor should be equipped with stops which cut off the energy source when the motor has wound the cable 36 up to a point where the reflector carriage 11 is flush with the top plate 12. A means for reversing the motor may also be provided so that the cable can be unwound thereby releasing the tension on the spring allowing it to retract and raise the reflector carriage 11 above the runway surface. The means for energizing the motor and light may be remotely located in a control tower. It will be aparent to one skilled in the art that by the inclusion of a motor in each runway light unit, the carriages can all be retracted concurrently thereby allowing snowplows to clear the snow off the entire runway surface. The runway light units may also be retracted during good visibility when the lights are not needed.

The coverplate 26, frontal links 25, brace 30, frontal link extension 28 and top plate 12 may be produced from any material having a strength sufficient to withstand loads such as are encountered when airplane wheels strike the light on takeoff and landing or by rolling over them while taxiing. The material should also be able to withstand the effects of weather. Some such suitable materials have been found to be, for example, aluminum, titanium and stainless steel. A circular top plate 12 has been used having a diameter of about 12 inches and a thickness of about ¾ inch. However, it is pointed out that different diameters and thicknesses may be utilized as well as sizes, shapes and configurations.

The runway lights may be placed into the runway in any desired pattern. The lights may also be used in series with one another; i.e., two lights used together and positioned so that they illuminate in opposing directions. By having the lights installed in this manner the lights can be used by aircraft landing from either direction on the same runway by retracting one group of lights.

The lighting means employed in the present invention for lighting runway surfaces may also be used to light other vehicularly traveled surfaces, such for example as, highways, automobile parking lots, crosswalks, and the like.

Obviously numerous modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A runway light unit comprising a receptacle buried within a vehicular traveled runway, a light source disposed in said receptacle, the upper extremity of said receptacle being substantially flush with the surface of said runway, a reflector carriage having slots formed therein, said reflector carriage carrying a reflector surface, said reflector carriage being pivotally connected to said receptacle adjacent an edge of said upper extremity thereof expected to be initially struck by approaching vehicular traffic, said reflector carriage being pivotally movable about said pivotal connection between a retracted position within said receptacle in which said carriage is substantially flush with said upper extremity of said receptacle and an elevated position wherein light emitted from said light source is reflected from said reflector surface through said slots over said pivotal connection upon said runway surface toward approaching vehicular traffic, and means for normally maintaining said reflector carriage in said elevated position yet yieldable for allowing retraction of said carriage to said retracted position when said carriage is struck by a vehicle traveling towards the reflected light.

2. A runway light unit according to claim 1 wherein said reflector carriage elevated position maintaining means is substantially completely positioned within said receptacle, and wherein said unit includes means for overriding the operation of said carriage elevated position maintaining means and effecting retraction of said carriage.

3. A runway light unit according to claim 2 wherein said reflector carriage elevated position maintaining means includes a resilient element having a minimum length when said reflector carriage is maintained in an elevated position relative to the runway surface.

4. A runway light unit according to claim 3 wherein said means for overriding the operation of said carriage elevated position maintaining means and effecting retraction of said carriage includes a reversible electric motor mounted within said receptacle and a cable interconnected between said reflector carriage and said motor which upon operation of said motor in one direction is wound in thereby to effect retraction of said carriage.

5. A runway light unit comprising a receptacle buried within a vehicular traveled runway, a light source disposed in said receptacle, a top plate secured to said receptacle, the upper surface of said top plate being substantially flush with the surface of said runway, an aperture formed in said top plate, a reflector carriage including a slotted upper surface and a reflector surface positioned on the lower side of said upper surface in angular relation thereto, said reflector carriage upper surface being pivotally connected to said top plate adjacent an edge thereof expected to be initially struck by approaching vehicular traffic, said reflector carriage being pivotally movable about said pivotal connection between a retracted position within said top plate aperture and said receptacle in which said carriage is substantially flush with said upper surface of said top plate and an elevated position wherein light emitted from said light source through said aperture is reflected from said reflector surface through said slots and over said pivotal connection upon said runway toward approaching vehicular traffic, and means for normally maintaining said reflector carriage in said elevated position yet yieldable for allowing retraction of said carriage to said retracted position when said carriage is struck by an approaching vehicle traveling towards the reflected light.

6. A runway light unit according to claim 5 wherein said reflector surface comprises a polished metal element projecting substantially downwardly from said reflector carriage upper surface.

7. A runway light unit according to claim 6 including means for effecting retraction of said carriage, comprising a reversible electric motor mounted within said receptacle and a cable interconnected between said reflector carriage and said motor which upon operation of said motor in one direction is wound in thereby to effect retraction of said carriage.

8. A runway light unit comprising a receptacle buried within a vehicular traveled runway, a light source disposed in said receptacle, a top plate secured to said receptacle, the upper surface of said top plate being substantially flush with the surface of said runway, an aperture formed in said top plate above said light source, a reflector carriage having a plurality of slots formed therein and having a reflector surface positioned on the lower surface thereof projecting substantially downwardly therefrom, said reflector carriage being pivotally connected at one end thereof to said top plate adjacent an edge thereof expected to be initially struck by approaching vehicular traffic, said reflector carriage being pivotally movable about said pivotal connection between a retracted position within said top plate aperture and said receptacle in which said carriage is substantially flush with the upper surface of said top plate and an elevated position wherein light emitted from said light source through said aperture is reflected from said reflector surface through said carriage slots over said pivotal connection and upon said runway surface towards approaching vehicular traffic, and means for normally maintaining said reflector carriage in said elevated position yet yieldable for allowing retraction of said carriage to said retracted position when said carriage is struck by an approaching vehicle traveling towards the reflected light.

9. A runway light unit according to claim 8 wherein said reflector carriage elevated position maintaining means comprises a spring having a minimum length when said reflector carriage is maintained in an elevated position relative to the runway surface.

References Cited in the file of this patent

UNITED STATES PATENTS

| | | |
|---|---|---|
| 2,848,597 | Knottnerus | Aug. 19, 1958 |

FOREIGN PATENTS

| | | |
|---|---|---|
| 300,045 | Germany | May 22, 1920 |
| 463,918 | Great Britain | Apr. 8, 1937 |
| 821,255 | France | Aug. 23, 1937 |